W. SEELY.
Wheel Cultivator.
No. 25,764. Patented Oct. 11, 1859.
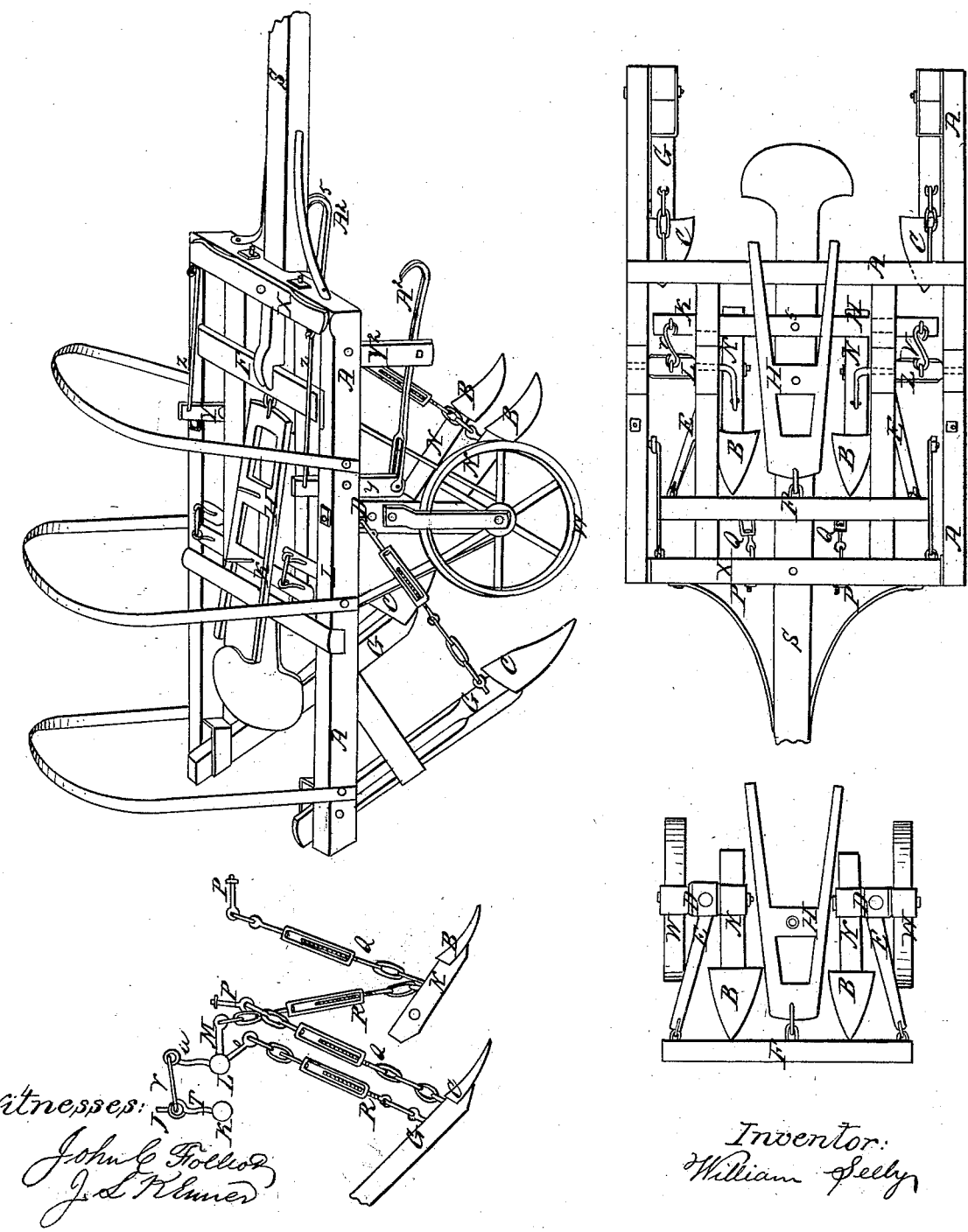
Witnesses:
John C. Follio?
J. S. Kemmer
Inventor:
William Seely

UNITED STATES PATENT OFFICE.

WILLIAM SEELY, OF CHILLICOTHE, ILLINOIS.

IMPROVEMENT IN CULTIVATORS.

Specification forming part of Letters Patent No. 25,764, dated October 11, 1859.

*To all whom it may concern:*

Be it known that I, WILLIAM SEELY, of Chillicothe, in the county of Peoria and State of Illinois, have invented a new and useful Improvement in Shovel-Plows; and I hereby declare the following to be a full and true description thereof, reference being had to the drawings herewith presented, which drawings constitute a part of said description.

The object of my invention is, first, to enable one person to perform as much work in a day by using two horses as can be done by two persons with the single plows or cultivators in the usual way. For this purpose I make a double-shovel plow having its frame elevated above the corn or cotton or other plants to be cultivated high enough to clear the row of plants, which pass under the middle of the frame, having two horses harnessed so as to travel on each side of a row.

Figure 1 is an isometrical view of the whole machine. Fig. 2 is a top view of the frame, showing the upper parts of the work. Fig. 3 is a top view of the steering apparatus detached from the carriage. Fig. 4 is a section showing the position and form of the lifting apparatus when taken without the carriage.

Similar letters denote similar parts in each figure.

Suppose the frame A to be three or four feet high, (more or less,) the two forward shovels, B and B, are carried on the upright pillars or posts D and D, which reach down near the ground, and are supported by braces of iron. These braces are screwed to the frame and extend under the post, and the post is allowed to swivel or turn on its pivot to the right or left. The post also carries the wheel W and supports the frame A.

By reference to the drawings, it will be seen at Fig. 3, which is a top view of the two forward shovels, B and B, with their posts D and D and their wheels W W, that the two posts are placed far enough apart to allow the shovels to throw the dirt a little up to the row of plants that pass between them. Provision is made also for steering a little to the right or left in order to avoid hitting the plants. For this purpose an arm, E, is framed into each post near its upper end, reaching forward and connected to a cross-bar, F. This bar F is connected in its center to the forked lever H, which serves as a handle to move the bar, so by pressing this lever H to the right or left I move the bar, and with it the arms of the two parts, and consequently the wheels and shovels, to the right or left. Another provision is made for raising all the shovels out of the ground when removing from one row to another or from field to field. (See Fig. 4, which is a side view of one set of lifting-chains detached from the frame in order to show their relative position as when attached to both shovels of one side.) The chains Q and Q are attached to ring-bolts P and P. These bolts are screwed into the frame and secure the shovels, regulating the depth to which they are required to work; but the chains R and R are attached to the arms M and O of the roller L, and also attached to the shovels B and C. The rollers L and L are connected by arms U and link V to the arm T of the shaft K, which lies across the carriage, and can be turned on its journals by the arm J, which projects upward from its middle, so by pressing down the arm J the shovels are all lifted out of the ground simultaneously.

It should be observed that the hindmost shovels, C and C, are placed at the sides, so as to work the ground over up to both the outside rows, so that two rows are cultivated by each time going through.

This machine should be constructed of a height and breadth sufficient to accord with the kind of plants to be cultivated and with the breadth of the spaces required between the rows. Another peculiarity of this machine is the arrangement for bringing the draft down to the proper height to accord with the height of the breast of the horse. It will be observed that the tongue S is elevated so as to clear the plants. The whiffletree X lies above the tongue, and is connected with the vertical lever Y by the rod Z. This lever has its fulcrum in its center, and extends downward, being furnished with the draft-hook $A^2$. (Seen at Fig. 1.) The other parts of this machine are so well understood as not to require a particular description.

I do not claim the invention of a shovel-plow, as that has been used before; but

What I claim as my invention, and desire to secure by Letters Patent, is—

The arrangement of the post D, arms E, cross-bar F, lever H, wheels W, shovels B and C, chains R and Q, arms U, cross-bar K, vertical levers Y and Y², rods Z, whiffletree X, and draft-hook A², the whole being constructed and combined in the manner and for the purpose above described.

In testimony whereof I hereunto subscribe in presence of two witnesses.

WILLIAM SEELY.

Witnesses:
J. L. KENNER,
JOHN C. FOLLIOTT.